United States Patent [19]
Bertacchi

[11] Patent Number: 5,903,840
[45] Date of Patent: May 11, 1999

[54] SYSTEM AND METHOD FOR ADAPTIVE MEASUREMENT COLLECTION AND HANDOFF QUEUING IN A RADIO TELECOMMUNICATIONS NETWORK

[75] Inventor: Mario Bertacchi, Ile-Bizard, Canada

[73] Assignee: Telefonaktiebolaget IM Ericsson (publ), Stockholm, Sweden

[21] Appl. No.: 08/587,027

[22] Filed: Jan. 16, 1996

[51] Int. Cl.$^6$ .................................................. H04Q 7/20
[52] U.S. Cl. ........................ 455/436; 455/434; 455/444; 370/332
[58] Field of Search .............................. 455/33.2, 33.1, 455/33.4, 33.3, 54.1, 56.1, 161.1, 161.3, 226.2, 434, 436, 444, 513, 515, 443, 437–438; 370/331–333; 379/59, 60, 63

[56] References Cited

U.S. PATENT DOCUMENTS

| | | | |
|---|---|---|---|
| 5,257,400 | 10/1993 | Yoshida | 455/33.1 |
| 5,278,991 | 1/1994 | Ramsdale et al. . | |
| 5,301,356 | 4/1994 | Bodin et al. . | |
| 5,345,499 | 9/1994 | Benveniste . | |
| 5,371,780 | 12/1994 | Amitay . | |
| 5,379,446 | 1/1995 | Murase . | |
| 5,422,933 | 6/1995 | Barnett et al. | 379/60 |
| 5,436,956 | 7/1995 | Shiotsuki et al. | 379/69 |
| 5,504,803 | 4/1996 | Yamada et al. | 379/59 |
| 5,524,280 | 6/1996 | Douthitt et al. | 455/62 |
| 5,602,903 | 2/1997 | LeBlanc et al. | 379/60 |

FOREIGN PATENT DOCUMENTS

| | | | |
|---|---|---|---|
| 0004714 | 1/1977 | Japan | 455/161.1 |

OTHER PUBLICATIONS

Chia, Mobile Radio and Personal Communications Pub., IEEE. pp. 225–232, Dec. 1991.

*Primary Examiner*—Andrew I. Faile
*Assistant Examiner*—Vincent F. Boccio
*Attorney, Agent, or Firm*—Steven W. Smith

[57] ABSTRACT

A system and method for improving handoff performance of a cellular telecommunications network having a serving exchange and a serving cell in which a mobile station is engaged in a call. The system adapts a first timeout period during which signal strength measurements are collected from a plurality of cells that neighbor the serving cell. A variable timing mechanism measures time periods starting when a handoff measurement request is generated. The system then sets the variable timing mechanism to measure a specified time period for each of the plurality of cells, collects the signal strength measurements during the specified time period, and processes the signal strength measurements when the specified time period expires. The system also adapts a second timeout period during which a handoff request from the mobile station is queued while awaiting an available voice channel in a target cell for handoff. The system measures a default value for the second timeout period, changes the default second timeout period to an adapted second timeout period for which there is a maximum probability of handing off a call associated with the handoff request, and determines whether the handoff request should be queued for the default second timeout period or the adapted second timeout period.

10 Claims, 9 Drawing Sheets

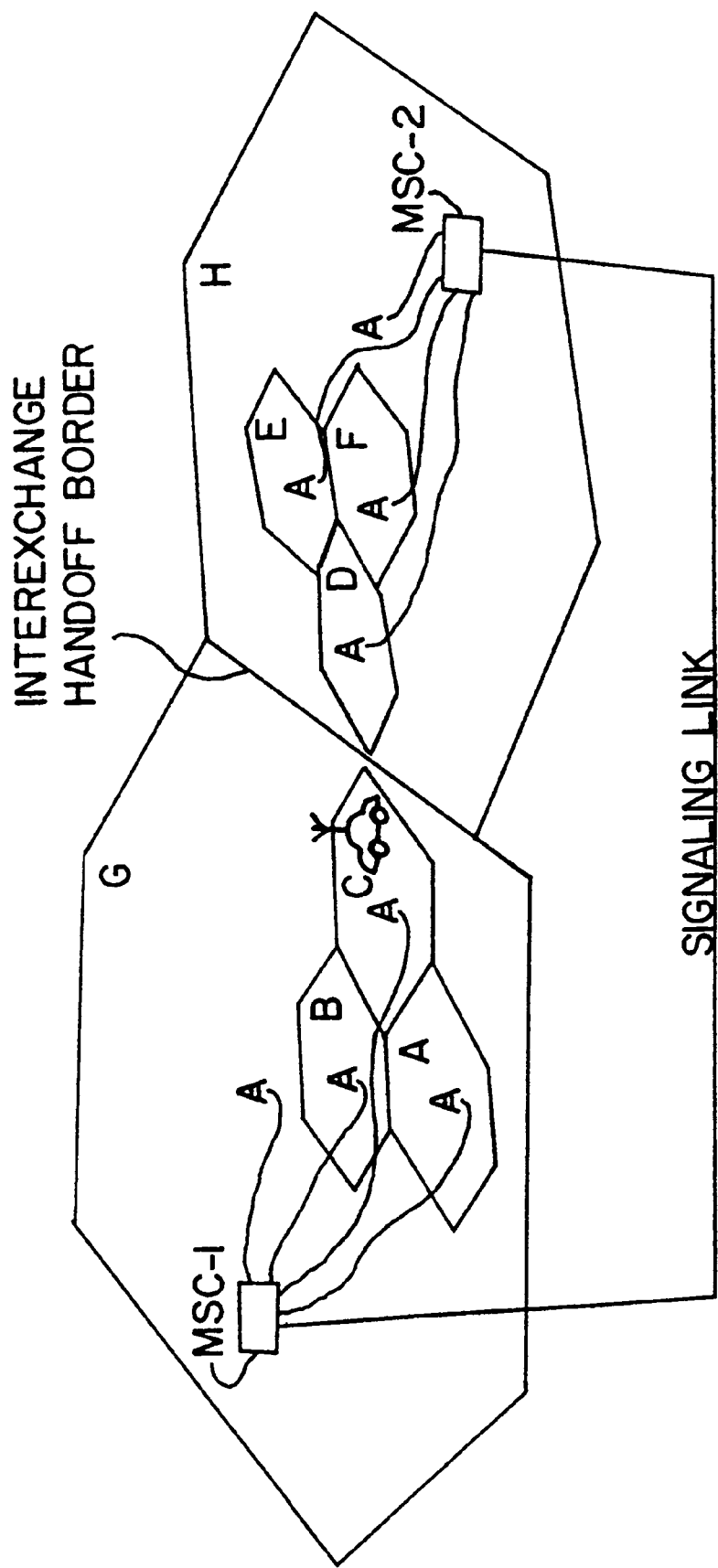

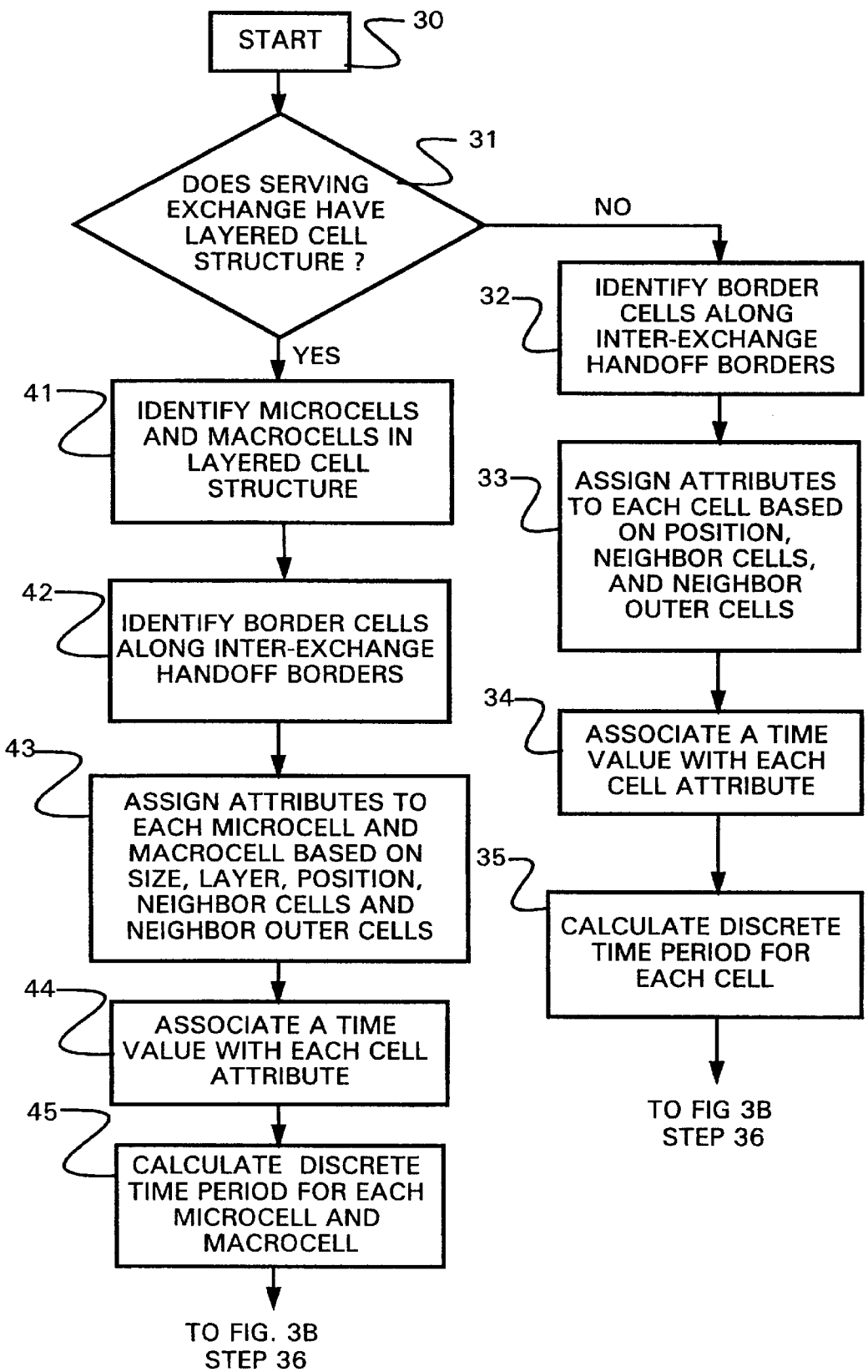

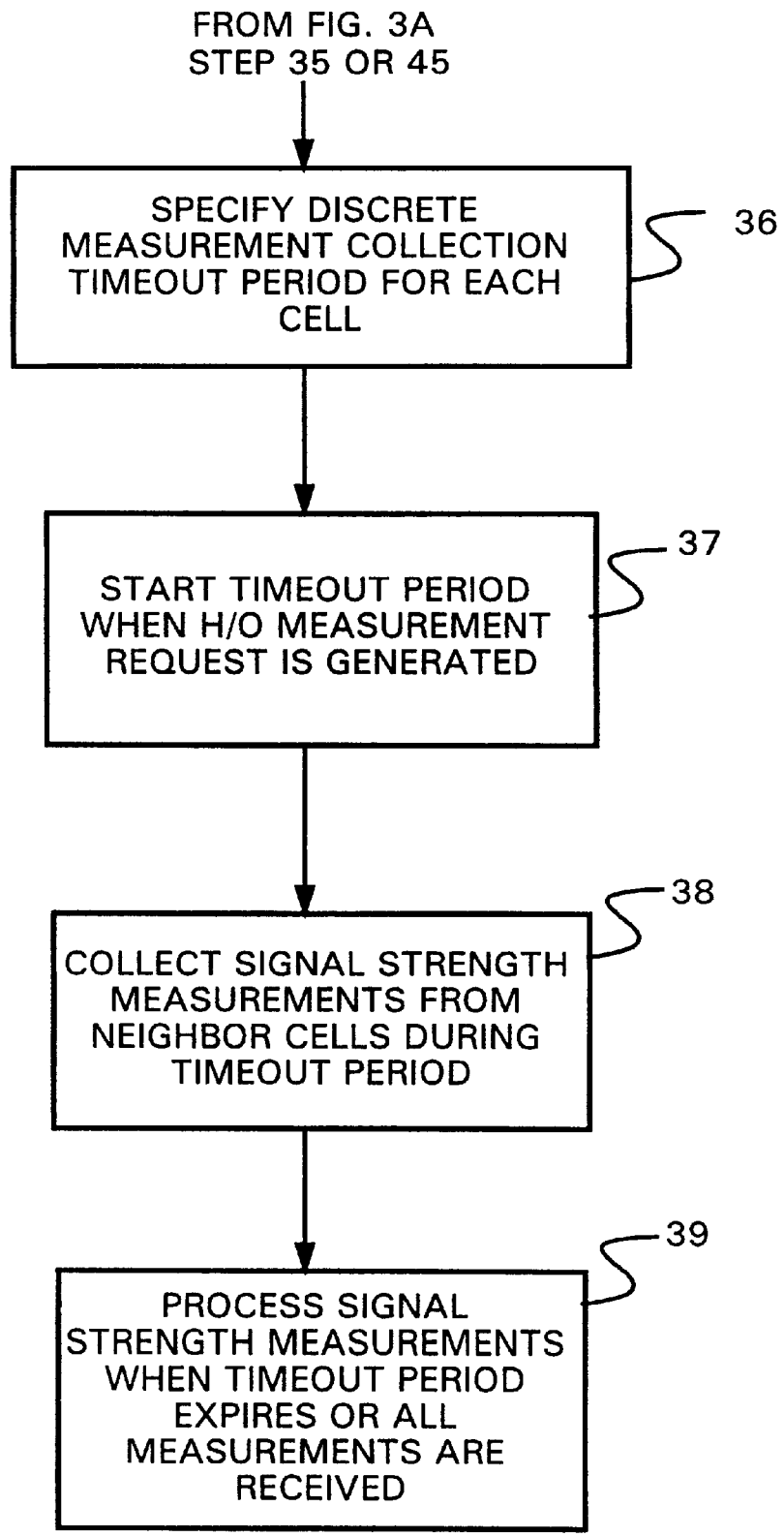

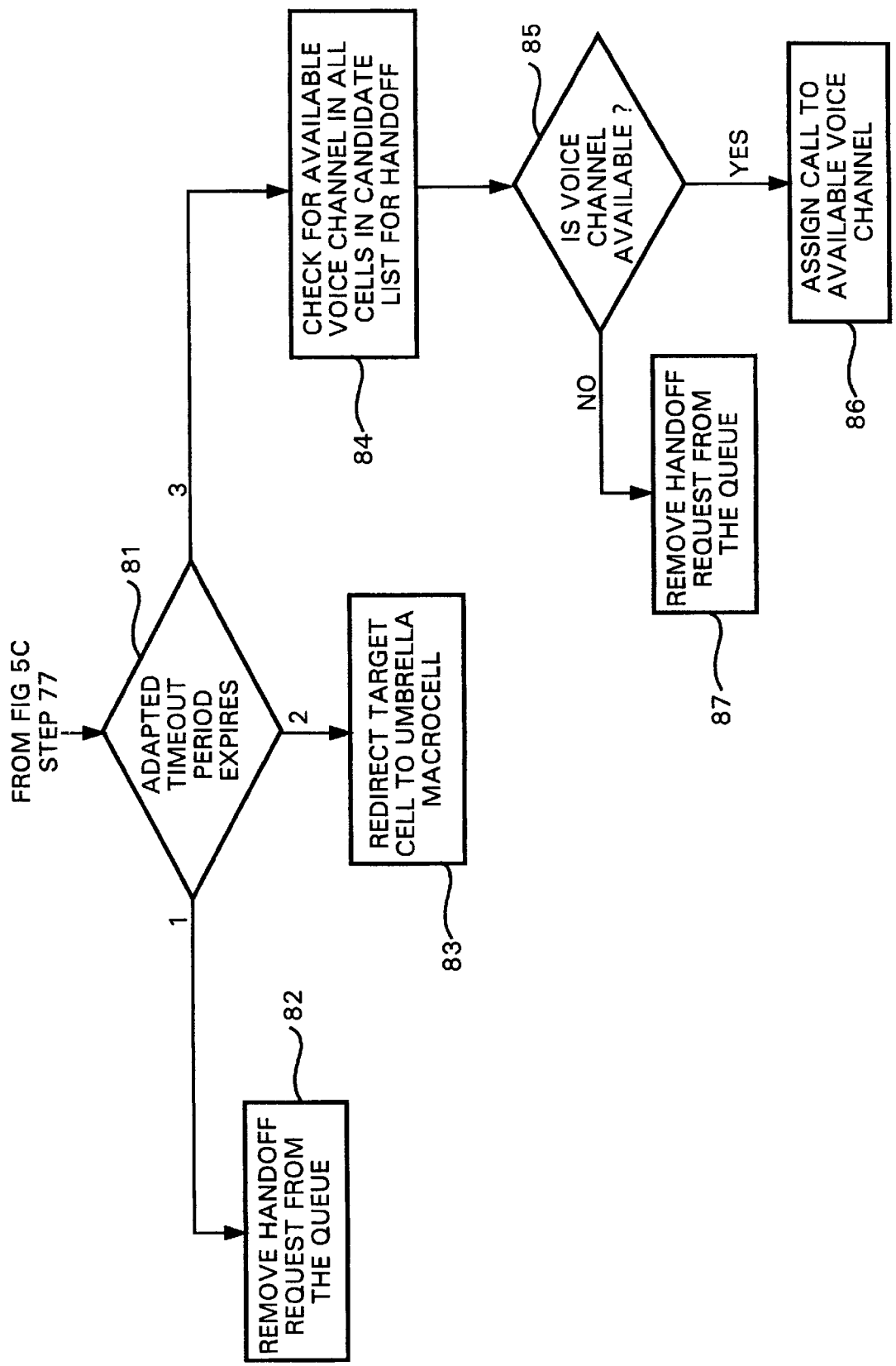

SYSTEM AND METHOD FOR ADAPTIVE MEASUREMENT COLLECTION AND HANDOFF QUEUING IN A RADIO TELECOMMUNICATIONS NETWORK

BACKGROUND OF THE INVENTION

1. Technical Field of the Invention

This invention relates to radio telecommunication systems and, more particularly, to a system and method for adapting a time period for the collection of signal strength measurements from serving cells and neighbor cells prior to and during handoff of a mobile station in layered cell structures and across exchange boundaries.

2. Description of Related Art

In existing cellular radio telecommunication systems, all base stations have signal strength receivers that measure the current signal strength of signals on all frequencies utilized in neighboring cells. When a call connection between a mobile station and its serving base station deteriorates in strength and/or quality, the serving base station requests a handoff from the serving mobile switching center (MSC). Before handing off the mobile station, the MSC performs a locating function to locate or identify available neighboring cells that have adequate signal strength to satisfy the handoff request. Signal strength measurements are taken in the serving cell in which the mobile station is operating as well as in neighbor cells. The measurements are then collected and compared in order to determine whether the mobile station should be handed off and if so, to which neighbor cell.

Existing systems have a fixed timeout delay during which the MSC receives signal strength measurements. At the conclusion of the timeout delay, the MSC compares the measurements that it has received, and makes the handoff determination. The existing fixed timeout delay is independent of cell configurations even though different cell configurations may affect the time required to collect signal strength measurements from all of the neighbor cells. For example, if the serving cell is a microcell in a layered cell structure, additional time may be required to collect measurements from higher layered cells and neighboring microcells. In this situation, the fixed timeout delay may not be sufficient to collect all the signal strength measurements prior to processing the data, thereby excluding the possibility of considering higher layer cells or some neighboring cells as handoff candidates. The fixed timeout delay is not addressed by any so-called "Fast Handoff Algorithms" proposed within the cellular telecommunications industry for microcells. These Fast Handoff Algorithms deal with the measurement of signal strengths by a single signal strength receiving device as opposed to the collection of measurements from a plurality of cells.

Additionally, for situations in which the neighbor cells include cells within the serving cell's exchange as well as outer cells in cooperating exchanges, all signal strength measurements from cells within the serving cell's exchange are withheld from processing until either (1) measurements from cooperating exchanges are received, or (2) timeout from the signaling protocol used to communicate with the cooperating exchanges occurs. At that point, all received measurements are then processed. By the time conditions 1 or 2 occur, measurements from cells within the serving cell's exchange may be up to 13 or 14 seconds old, and may no longer be representative of signal strengths in those cells. However, the system cannot merely ignore the measurements from neighbor outer cells, because to do so would preclude inter-exchange handoffs. Therefore, a method is needed to balance between waiting for outer cell measurements and beginning handoff processing in order to optimize the handoff process.

Condition 1 may cause a handoff failure if one or more of the mobile switching centers (MSCs) in the cooperating exchanges is programmed with an excessive delay. An excessive delay may allow the mobile station to move out of the coverage area of the serving cell, causing the signal strength and/or signal quality to deteriorate to the point that the call is dropped before the measurements are processed and a handoff determination is made. MSCs in cooperating exchanges may be manufactured by different manufacturers who design their systems with different delays in returning signal strength measurements. Therefore, when the MSC in a cooperating exchange is manufactured by a different manufacturer, the delay in returning signal strength measurements is not within the control of the serving exchange, but nonetheless, may adversely impact its handoff performance.

Condition 2, waiting for timeout from the signaling protocol used to communicate with the cooperating exchanges to occur, may also cause handoff failures. This timeout delay may allow the mobile station to move out of the coverage area of the serving cell before the measurements are processed and a handoff determination is made. Some revisions of the IS-41 intersystem signaling protocol, for example, have had timeout delays as long as 15-seconds. This delay in processing the received signal strength measurements has particularly adverse effects when the mobile station is operating in a microcell and starts to move out of the serving cell. By the time the 15-second delay has elapsed, the mobile station may have moved out of the serving microcell, causing the signal strength and/or signal quality to deteriorate to the point that the call is dropped before the measurements are processed and a handoff determination is made. Therefore, in existing cellular radio telecommunication systems, the deployment of microcells must be restricted to avoid certain configurations having a higher probability of dropped calls due to the excessive timeout delay.

Although there are no known prior art teachings of a solution to the aforementioned deficiency and shortcoming, U.S. Pat. No. 5,301,356 to Bodin et al. (Bodin) discusses subject matter that bears some relation to matters discussed herein. Bodin discloses a system and method for ensuring that handoff requests take priority over new requests to engage voice channels. If no voice channels are available when a handoff request to a particular target cell is received, Bodin stores the handoff request in a corresponding queue for a predetermined period of time. If a voice channel becomes available while the handoff request is stored, the voice channel is utilized to satisfy the handoff request. Only if the handoff queue is empty are voice channels assigned to new call requests.

The predetermined time period of Bodin is separate and distinct from the timeout delay of the present invention. The predetermined time period of Bodin begins after the locating procedure is completed and has located neighbor cells which are acceptable as target cells for handoff, and after the handoff request is generated and stored in the handoff queue. At the conclusion of the time period of Bodin, the handoff request is removed from the queue. The purpose of the time period of Bodin is to ensure that if no handoff is possible to a particular target cell, each handoff request is directed to another target cell which may be able to satisfy the handoff request before the call connection deteriorates to the point that it is lost.

The measurement collection timeout delay of the present invention, on the other hand, is part of the locating procedure that identifies satisfactory target cells for handoff. As noted above, the timeout delay is the length of time that the MSC will wait for signal strength measurements to be received from serving and neighbor cells before it analyzes the measurements received to determine the best target cell. The adaptive queuing timeout delay of the present invention adapts the queuing timeout delay based upon network topology and the signal strength and quality in the target cell for handoff at the time the signal strength measurements were collected. This is a capability that is neither taught nor suggested by Bodin. Thus, review of the foregoing reference reveals no disclosure or suggestion of a system or method such as that described and claimed herein.

In order to overcome the disadvantage of existing solutions, it would be advantageous to have a system and method for adapting the measurement collection timeout delay to different configurations of serving cells and neighbor cells in layered cell structures and across exchange boundaries. Such a system and method would adapt the measurement collection timeout delay for configurations in which the existing fixed timeout delay, the timeout delay of cooperating MSCs, or the timeout delay of intersystem signaling protocols increase the possibility of handoff failures. It would also be advantageous to have a system and method for adapting the queuing timeout delay for different network topologies. The present invention provides such a system and method.

SUMMARY OF THE INVENTION

In one aspect, the present invention is a system for adapting a time period for collecting signal strength measurements from a plurality of cells that neighbor a serving cell in a cellular telecommunications network. The system comprises a variable timing mechanism that measures time periods starting when a handoff measurement request is generated and means for setting the variable timing mechanism to measure a specified time period for each of the plurality of cells. The system also includes means for collecting signal strength measurements during the specified time period, and means for processing the signal strength measurements when the specified time period expires.

The system may also comprise means for determining a layered cell structure within the cellular telecommunications network, means for identifying microcells and macrocells within the layered cell structure, and means for specifying the time period for each of the microcells and macrocells to optimize handoff performance in the network. The means for specifying a time period for each of the microcells and macrocells may include means for assigning a plurality of cell attributes to each of the microcells and macrocells in the network, including cell size, position of each microcell and macrocell in the layered cell structure, and neighbor cells of each microcell and macrocell. The means for specifying a time period also includes means for associating a time value with each of the plurality of cell attributes, and means for calculating a cumulative time period for the specified time period.

In another aspect, the present invention is a system and method of improving handoff performance of a cellular telecommunications network having a serving exchange and a serving cell in which a mobile station is engaged in a call. The system adapts a first timeout period during which signal strength measurements are collected from a plurality of cells that neighbor the serving cell. A variable timing mechanism measures time periods starting when a handoff measurement request is generated. The system then sets the variable timing mechanism to measure a specified time period for each of the plurality of cells, collects the signal strength measurements during the specified time period, and processes the signal strength measurements when the specified time period expires. The system also adapts a second timeout period during which a handoff request from the mobile station is queued while awaiting an available voice channel in a target cell for handoff. The system measures a default value for the second timeout period, changes the default second timeout period to an adapted second timeout period for which there is a maximum probability of handing off a call associated with the handoff request, and determines whether the handoff request should be queued for the default second timeout period or the adapted second timeout period.

BRIEF DESCRIPTION OF THE DRAWINGS

The invention will be better understood and its numerous objects and advantages will become more apparent to those skilled in the art by reference to the following drawing, in conjunction with the accompanying specification, in which:

FIG. 2 is an illustrative drawing of a layered cell structure in a cellular radio telecommunications network illustrating a situation in which the present invention is utilized to select a shortened timeout delay in order to effect a successful handoff;

FIGS. 3A–3B are a flow chart illustrating the steps involved in calculating and utilizing a discrete measurement collection timeout period for each cell according to the teachings of the present invention;

FIGS. 5A–5D are a flow chart illustrating the steps involved in implementing and utilizing an adaptive handoff queuing mechanism in accordance with the teachings of the present invention.

DETAILED DESCRIPTION OF EMBODIMENTS

Figure 1:
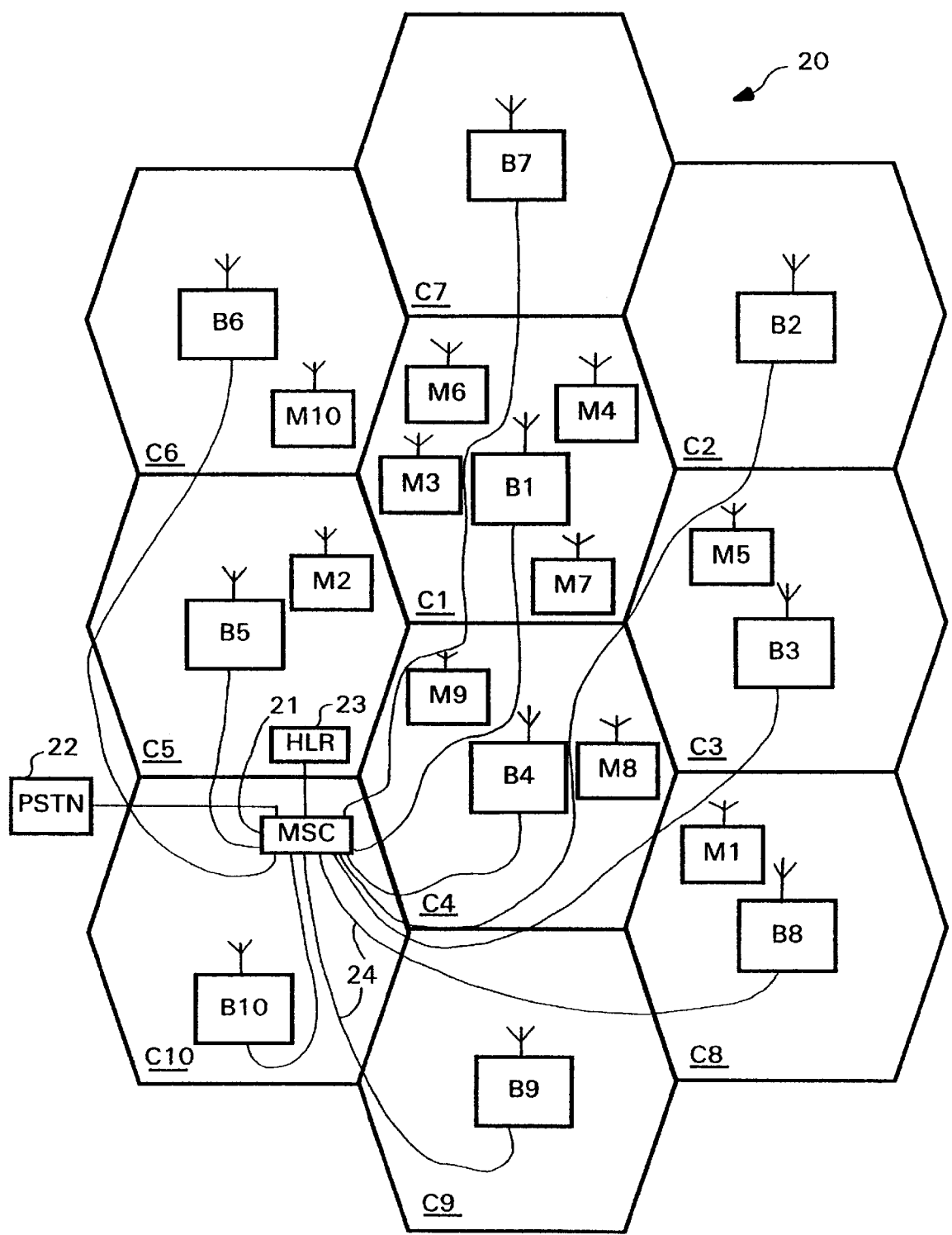
FIG. 1 is a block diagram illustrating components of a cellular radio telecommunications network 20 associated with the present invention.

FIG. 1 is a block diagram illustrating components of a cellular radio telecommunications network 20 associated with the present invention. In FIG. 1, an arbitrary geographic area may be divided into a plurality of continuous radio coverage areas, or cells C1–C10. Although the network of FIG. 1 is illustratively shown to only include 10 cells, it should be clearly understood that in practice, the number of cells could be much larger.

Associated with and located within each of the cells C1–C10, is a base station designated as a corresponding one of a plurality of base stations B1–B10. Each of the base stations B1–B10 includes a transmitter, receiver, signal strength receiver, and a base station controller as are well known in the art. In FIG. 1, the base stations B1–B10 are selected to be located at the center of each of the cells C1–C10, respectively, and are equipped with omni-directional antennas. However, in other configurations of a cellular radio network, the base stations B1–B10 may be located near the periphery, or otherwise away from the centers of the cells C1–C10 and may illuminate the cells C1–C10 with radio signals either omni-directionally or directionally. Therefore, the representation of the cellular radio network of FIG. 1 is for purposes of illustration only and is not intended as a limitation on the possible implementations of a system for providing enhanced subscriber services in a mobile radio telecommunications network.

With continuing reference to FIG. 1, a plurality of mobile stations M1–M10 will be found within the cells C1–C10. Again, only ten mobile stations are shown in FIG. 1, but it should be understood that the actual number of mobile stations may be much larger and, in practice, will invariably greatly exceed the number of base stations. Moreover, mobile stations M1–M10 are illustrated in some of the cells C1–C10. The presence or absence of mobile stations in any particular one of the cells C1–C10 should be understood to depend, in practice on the individual desires of subscribers utilizing the mobile stations M1–M10. Subscribers may roam from one location in a cell to another, or from one cell to an adjacent cell or neighboring cell, and even from one cellular radio network served by a mobile switching center (MSC) 21 to another such network all the while receiving and placing calls both within the cellular network 20 as well as the public switch telecommunication network (PSTN) 22 which is connected to the MSC 21. The MSC 21 may also have associated with it a home location register (HLR) 23 which may be physically separate or connected to the MSC. The HLR 23 serves as a database of subscriber information for roaming subscribers. The HLR contains all the mobile subscriber data, such as subscriber identity, supplementary services, bearer services, and location information necessary to route incoming calls. The HLR 23 may be shared by a group of MSC's. Networks employing digital services may also include a message center (MC) (not shown) for storage and routing of short message service (SMS) messages.

Each of the mobile stations M1–M10 is capable of initiating or receiving a telephone call through one or more of the base stations B1–B10 and the MSC 21. Such calls may be either for voice or data communications. The MSC 21 is connected by communication links 24 (e.g., cables) to each of the illustrative base stations B1–B10 and the PSTN 22 or a similar fixed network which may be include an integrated services digital network (ISDN) facility (not shown). The relevant connections between the MSC 21 and the base stations B1–B10, or between the MSC 21 and the PSTN 22, are not completely shown in FIG. 2 but are well known to those of ordinary skill in the art. Similarly, it is also known to include more than one mobile switching center (MSC) in the cellular radio network and to connect each additional MSC to a different group of base stations and to other MSCs via cables or radio links.

Each of the cells C1–C10 is allocated a plurality of voice or speech channels and at least one access or control channel, such as a forward control channel (FOCC). The control channel is used to control or supervise the operation of the mobile station by means of information transmitted and received from those units, referred to as messages. Control and administration messages within a cellular radio network are sent in accordance with industry established air interface standards, such as EIA/TIA 553, the standard for analog cellular operations, and/or EIA/TIA 627 (formerly IS-54B) and IS-136, the standards for digital cellular operations, all of which are hereby incorporated by reference herein. Integrated services between different cellular telecommunication systems are provided by using the intersystem specification IS-41, which is hereby incorporated by reference herein. While these standards govern North American operations, similar standards govern other geographic areas throughout the world, and are well known to those skilled in the art.

The information exchanged between base stations and mobile stations via messages, may include incoming call signals, outgoing call signals, paging signals, paging response signals, location registration signals, voice channel assignments, maintenance instructions, SMS messages, and handoff instructions as the mobile stations travel out of the radio coverage of one cell and into the radio coverage of other cells, as well as other additional items of information such as calling party numbers, time information, and the like.

In the busy operating mode, there are two alternative methods of performing the locating function and to identify when a handoff should be initiated. One method utilizes mobile assisted handoff (MAHO), and one method does not utilize MAHO.

Location Utilizing MAHO

For those networks that utilize MAHO, the mobile station performs the Location function. With MAHO, the mobile station receives on a dedicated channel, a neighbor list identifying neighboring cells from which the mobile station is to measure the signal strength. The mobile station measures the quality of the connection by measuring the bit error rate and the received signal strength on its assigned channel. The mobile station also measures the signal strength of channels in neighboring cells indicated in a Measurement Order from the base station. The Measurement Order includes measurement channels in neighboring cells. The channels are then ranked according to the signal strength received at the mobile station. These signal strength measurements are then utilized to assist the network in making a handoff determination and to identify the best candidate cell for handoff.

When a mobile station in idle mode operates on a digital control channel (DCC) in a cellular network, the serving MSC transmits the neighbor list over the DCC to the mobile station. When the mobile station is in the busy mode, the measurement order is broadcast over the digital traffic channel to the mobile station at call setup and handoff. The mobile station continuously measures between bursts, the received signal strength from each of the measurement channels in the cells specified in the neighbor list. If, for example, the mobile station is utilizing the first time slot for voice communications, it may utilize the second and third time slots for obtaining signal strength measurements from neighbor cells. This information is then compared to network criteria to make the handoff determination and to identify the best candidate cell for handoff.

When utilizing MAHO, the serving base station receives channel quality messages of its neighboring cells from the mobile station and compares the channels with each other. The base station considers received signal strength and propagation path loss (transmitted power level minus received signal strength). Parameters in the base station determine whether a request for handoff should be sent to the MSC.

Location Without Utilizing MAHO

In cellular networks that do not utilize MAHO to assist in the handoff process, signal strength receivers perform the base station's portion of the locating function. The signal strength receivers are deployed in base stations throughout the network for measuring signal strengths from mobile stations in conversation state in neighboring cells. The signal strength receiver in a particular base station operates on each frequency band operated by that base station and its neighbor cells. The signal strength measurements are provided to the MSC which determines the best candidate cell for handoff.

FIG. 2 is an illustrative drawing of a layered cell structure in a cellular radio telecommunications network illustrating a situation in which the present invention is utilized to select a shortened timeout delay in order to effect a successful handoff. A macrocell G overlays microcells A, B, and C. A macrocell H overlays microcells D, E, and F. MSC-1 is associated with macrocell G and microcells A, B, and C, while MSC-2 is associated with macrocell H and microcells D, E, and F. Therefore, an inter-exchange boundary exists between macrocells G and H. MSC-1 and MSC-2 communicate via a signaling link, and may utilize a standard intersystem communications protocol such as IS-41.

For a mobile station located in microcell C, microcells A, B, and D may be considered as neighbor cells. In addition, macrocells G and H may also be considered as neighbor cells to microcell C. In such a configuration of layered cell structures, MSCs normally prioritize neighbor cells in order of preferred handoff. For a mobile station operating in a microcell such as microcell C, and moving into microcell B, the MSC-1 prefers to handoff the mobile station to microcell B rather than the umbrella macrocell G, and will attempt the handoff to microcell B first. Otherwise, the benefit of having microcells is reduced. This prioritization, however, imposes stricter handoff requirements on the system. In such a configuration of serving cell and overlying and inter-exchange neighbor cells, a shorter timeout delay than the existing fixed timeout delay may be needed in order to assure a successful handoff.

In a first embodiment of the present invention, the network operator is provided with a system for specifying a time value for each cell in the network. The system then applies different collection timeouts to different cells. The timeout values for each cell may be stored as an additional cell attribute in the MSC, or may be added as a command parameter in an existing command or a new command setting up a feature. The operator weighs known cell attributes such as configuration data regarding which cells neighbor a given cell and the given cell's layer in the network cell structure in order to specify a time value for the cell. If no time value is specifically assigned to a given cell by the operator, then a default value is assigned by the system.

In a second embodiment of the present invention, a lookup table is defined within the system to relate combinations of neighbor cell attributes to timeout values. Unique timeout values are defined for each neighbor cell depending on its cell type (e.g., within the serving exchange, in a cooperating exchange, type of signaling protocol utilized, microcell, etc.). For a given serving cell, the system correlates the neighbor cells to timeout values in the lookup table, and determines the shortest timeout value for all the applicable neighbor types. This timeout value is then utilized by the system for the time at which signal strength measurements are processed.

The present invention provides an operator with the capability to optimize different areas of a particular telecommunication system for the best handoff performance. For example, in the layered cell structure of FIG. 2, the operator may select shorter timeout delays between microcells even though the shorter delay may preclude receiving measurements from neighbor outer cells in some cases. Since some percentage of handoffs will be to other serving-exchange cells anyway, the operator may find that the shorter delay increases the percentage of successful handoffs. The operator may also collect statistics relating to the delay in receiving measurements from cooperating exchanges and set the timeout delay for border cells at a value slightly greater than the time required to receive all measurements. This value may be significantly less than waiting the full 15 seconds provided by IS-41, and may, therefore, enhance handoff performance.

The system and method of the present invention are applicable to both analog cellular telecommunication systems and digital systems in which MAHO is not utilized.

FIGS. 3A–3B are a flow chart illustrating the steps involved in calculating and utilizing a discrete measurement collection timeout period for each cell according to the teachings of the present invention. The process begins at step 30 and moves to step 31 where it is determined whether or not the serving exchange has a layered cell structure. If the serving exchange does not have a layered cell structure, the process moves to step 32 and identifies border cells along inter-exchange handoff borders. At step 33, the process assigns attributes to each cell based on each cell's position relative to neighbor cells and the exchange border, the number of neighbor cells, and the number and position of neighbor outer cells in adjacent exchanges.

The process then moves to step 34 where a time value is associated with each of the assigned cell attributes. Then, at step 35, the process calculates a discrete time period for each cell based upon the attributes of each cell and the associated time values. The process then moves to FIG. 3B, step 36 where a discrete measurement collection timeout period is specified for each cell and stored in the MSC. At step 37, the measurement collection timeout period is started for a particular cell when a handoff measurement request is generated. Signal strength measurements are then collected at step 38 from neighbor cells and neighbor outer cells during the measurement collection timeout period. Finally, at step 39, the signal strength measurements are processed to determine the best candidate cell for handoff when either the measurement collection timeout period expires, or all signal strength measurements are received, whichever occurs first.

If, however, at step 31 it was determined that the serving exchange has a layered cell structure, the process moves to step 41 where microcells and macrocells in the layered cell structure are identified. At step 42, the process identifies border cells along inter-exchange handoff borders. At step 43, the process assigns attributes to each microcell and macrocell based on each cell's size, layer, position relative to neighbor cells and the exchange border, the number of neighbor cells, and the number and position of neighbor outer cells in adjacent exchanges.

The process then moves to step 44 where a time value is associated with each of the assigned cell attributes. Then, at step 45, the process calculates a discrete time period for each microcell and macrocell based upon the attributes of each cell and the associated time values. The process then moves to FIG. 3B, step 36 where the process continues as described above.

The present invention may also be expanded to include an adaptive handoff queuing mechanism. This aspect of the invention is applicable to the handoff process after an attempt to handoff a mobile station has failed because of the lack of an available voice channel (i.e., congestion) in every candidate cell. The handoff request is queued while the MSC checks for an available voice channel in the first candidate cell only. The system queues the request for a maximum predetermined time period, for example 5 seconds. The handoff request is removed from the queue at the expiration of the 5-second timeout period, or earlier if (1) a voice channel becomes available, (2) the parties terminate the call, or (3) a new handoff request is received from the mobile station. If a new handoff request is received, the process starts over.

Additionally, after a certain period of time, the list of candidate cells may no longer be valid, and new signal strength measurements should be taken. This is particularly evident when the mobile station is operating in an exchange with a layered cell structure of microcells and macrocells. It is a waste of system resources to perform the processing required to continue the queue under circumstances in which the target cell may no longer be a viable candidate, or the entire list of candidate cells may no longer be valid.

When queuing, there are two competing processes in the MSC. One which is trying to get a voice channel from the first candidate cell, and another which is obtaining new handoff requests from the mobile station. In digital telecommunication systems, the mobile station may send another handoff request every second. If a handoff request is queued when another request is received, the MSC terminates the queue and cycles through the candidate list included in the second handoff request searching for an available voice channel. Thus, it is unlikely that a request in a digital system will be queued for the full 5 second handoff request queuing period.

In analog systems, handoff requests are less frequent, and it is more likely that the request will be queued for the full 5 second handoff request queuing period. This longer queuing period increases the probability of receiving a handoff request specifying a different target cell during the 5-second timeout period, especially in an environment with microcells. Because of the smaller cell size, adjacent cell boundaries are closer together, and the mobile station is more likely to move out of the smaller cells within the 5-second period.

The longer a handoff request is queued, the higher the probability that a voice channel will become available in the first candidate cell. However, there is also a higher probability that the mobile station will have requested handoff to a different cell by that time. Thus, the longer the handoff request is queued, the more likely it is that the mobile station will be handed off to a different cell than the one requested in its most recent handoff request.

Since the cell requested in the most recent handoff request is the optimal cell at that time, in terms of signal strength and signal quality, there is a higher probabillity that the handoff is made to a cell of lesser signal strength or quality, and the likelihood of lower voice quality, higher interference, and more dropped calls is increased. This is particularly true for system implementations that give priority for handoff to neighboring microcells rather than umbrella macrocells. Reducing the queue time for network topologies where there are microcells should increase the percentage of successful handoffs.

The present invention provides a system and method for adapting the handoff queuing time depending on the network topology and, in particular, whether or not there are microcells present. While waiting, the system analyzes whether it should continue to hold the handoff request in the queue for the full five seconds. The system analyzes the likelihood of the target cell still being a viable candidate at the expiration of the 5-second delay based on signal strength and quality at the time the handoff measurements were taken, and the network topology. The queuing time may then be lengthened or shortened, based upon the determined likelihood that the target cell and handoff candidate list are still valid.

At the expiration of the adaptive queuing time period, the system may take one of several actions. First, the MSC may simply remove the handoff request from the queue, thereby saving system resources required to queue the handoff request when the likelihood of a successful handoff is low.

Second, the system may alter the target cell for handoff if the mobile station is passing from one microcell to another, and there is an overlying umbrella macrocell. Instead of queuing the handoff request which is targeted to a congested microcell, the system may redirect the handoff request to the umbrella macrocell because the macrocell will most likely remain a viable candidate for a longer period of time. Third, the system may remove the handoff request from the queue and cycle through the candidate list a second time to ascertain whether a voice channel has become available in any of the other candidate cells.

Figure 4:
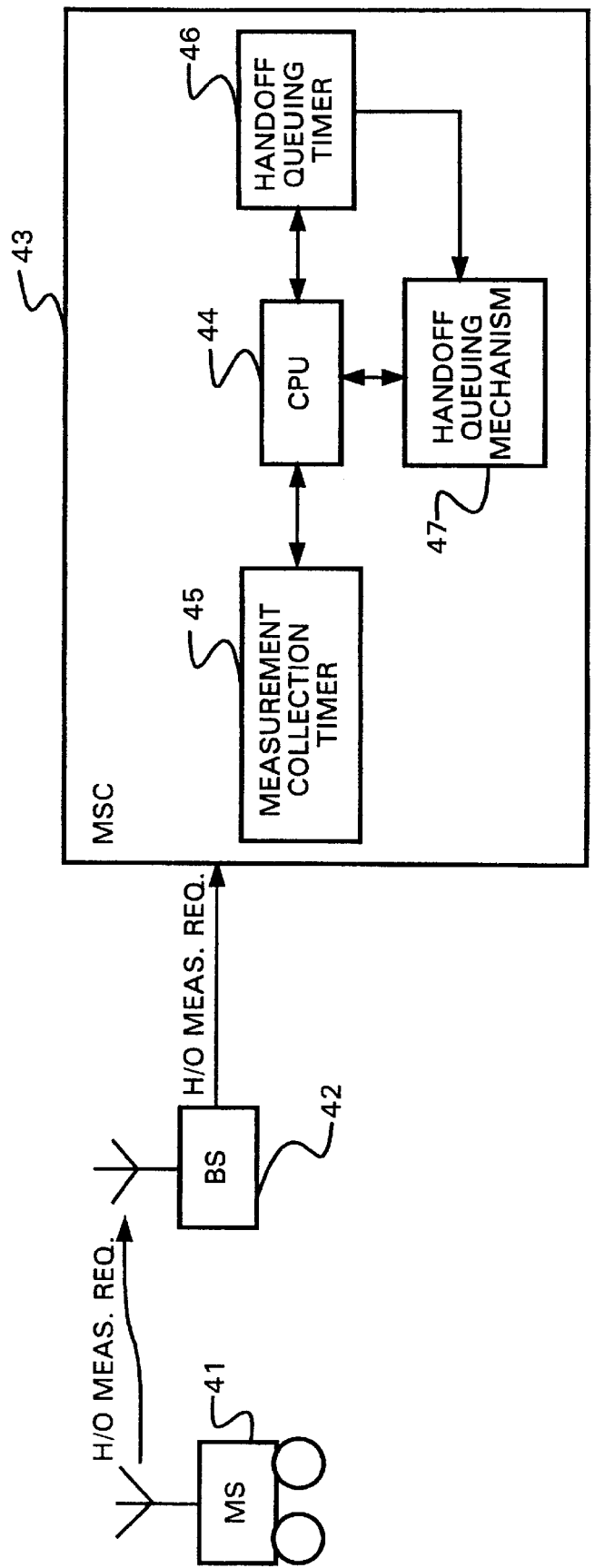
FIG. 4 is a simplified block diagram illustrating the implementation of an adaptive measurement collection timer and an adaptive handoff queuing mechanism and timer in a mobile switching center (MSC)

FIG. 4 is a simplified block diagram illustrating the implementation of an adaptive measurement collection timer and an adaptive handoff queuing mechanism and timer in a mobile switching center (MSC). It is shown in FIG. 4 that a mobile station (MS) 41 sends a handoff measurement request message to a base station (BS) 42 which forwards the request to the MSC 43. A central processing unit (CPU) 44 in the MSC controls and coordinates the functions performed by the MSC. A measurement collection timer 45 is connected to the CPU 44 and identifies to the MSC when the discrete timeout period for each cell expires. A handoff queuing timer 46 is also connected to the CPU 44 and identifies to the MSC when the standard 5-second queuing timeout period and adapted timeout periods have expired. An adaptive handoff queuing mechanism 47 is connected to the CPU 44 and the handoff queuing timer 46, and calculates the adapted timeout period for each queued handoff request, depending on the location of the mobile station in the layered cell structure of the serving exchange.

FIGS. 5A–5D are a flow chart illustrating the steps involved in implementing and utilizing an adaptive handoff queuing mechanism in accordance with the teachings of the present invention. The process begins at step 51 where the MSC checks for an available voice channel in the cells in the candidate list for handoff. At step 52 it is determined whether or not a voice channel is available. If a voice channel is available, the process moves to step 53 where the call is assigned to the available voice channel. If, however, it is determined at step 52 that a voice channel is not available, then the process moves to step 54 where the handoff request is queued for the first candidate cell in the candidate list for handoff.

As noted above, the handoff request is removed from the queue at the expiration of the queuing timeout period, or earlier if the parties terminate the call, if a voice channel becomes available, or if another handoff request is received from the mobile station. Therefore, at step 55, the process determines whether or not the call has been terminated. If the call has been terminated, the process moves to step 56 where the handoff request is removed from the queue. If the call has not terminated, the process moves from step 55 to step 57 where it is determined whether or not a voice channel has become available in the first candidate cell. If a voice channel has become available, the handoff request is removed from the queue, and the call is assigned to the available voice channel. If, however, a voice channel has not become available, the process moves to FIG. 5B, step 61.

At step 61, it is determined whether or not a predetermined default queuing timeout period has expired. A default setting such as, for example 5-seconds, may be set for the queuing timeout period. If the period has expired, the handoff request is removed from the queue at step 62. If the period has not expired, the process moves from step 62 to step 63 where it is determined whether or not a subsequent handoff request has been received from the mobile station. If another handoff request has been received, the process removes the handoff request from the queue at 64, and then returns to step 51 (FIG. 5A) where the handoff process starts over by checking for an available voice channel in all of the cells in the candidate list for handoff included in the subsequent handoff request.

Figure 5A:
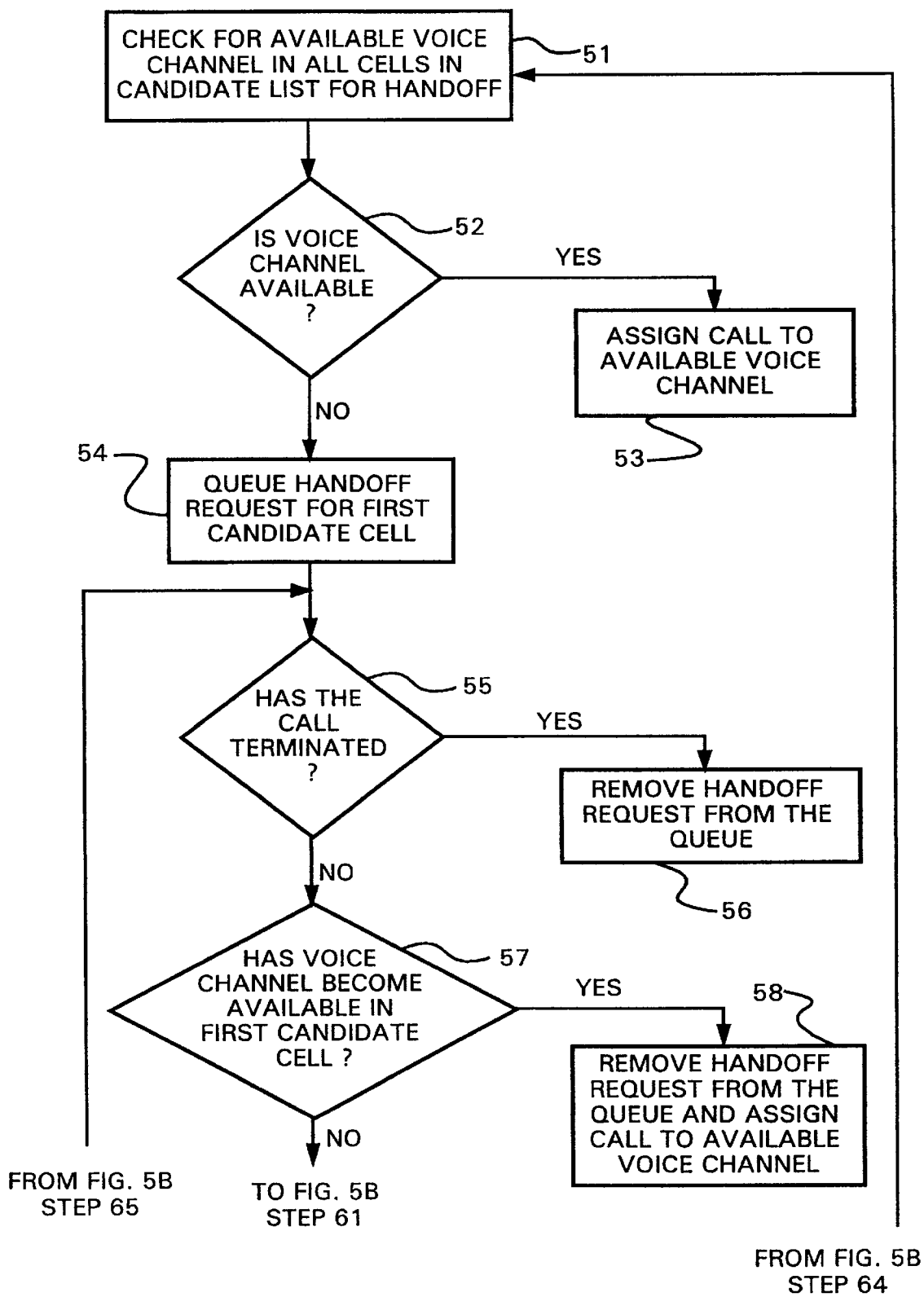
Figure 5B:
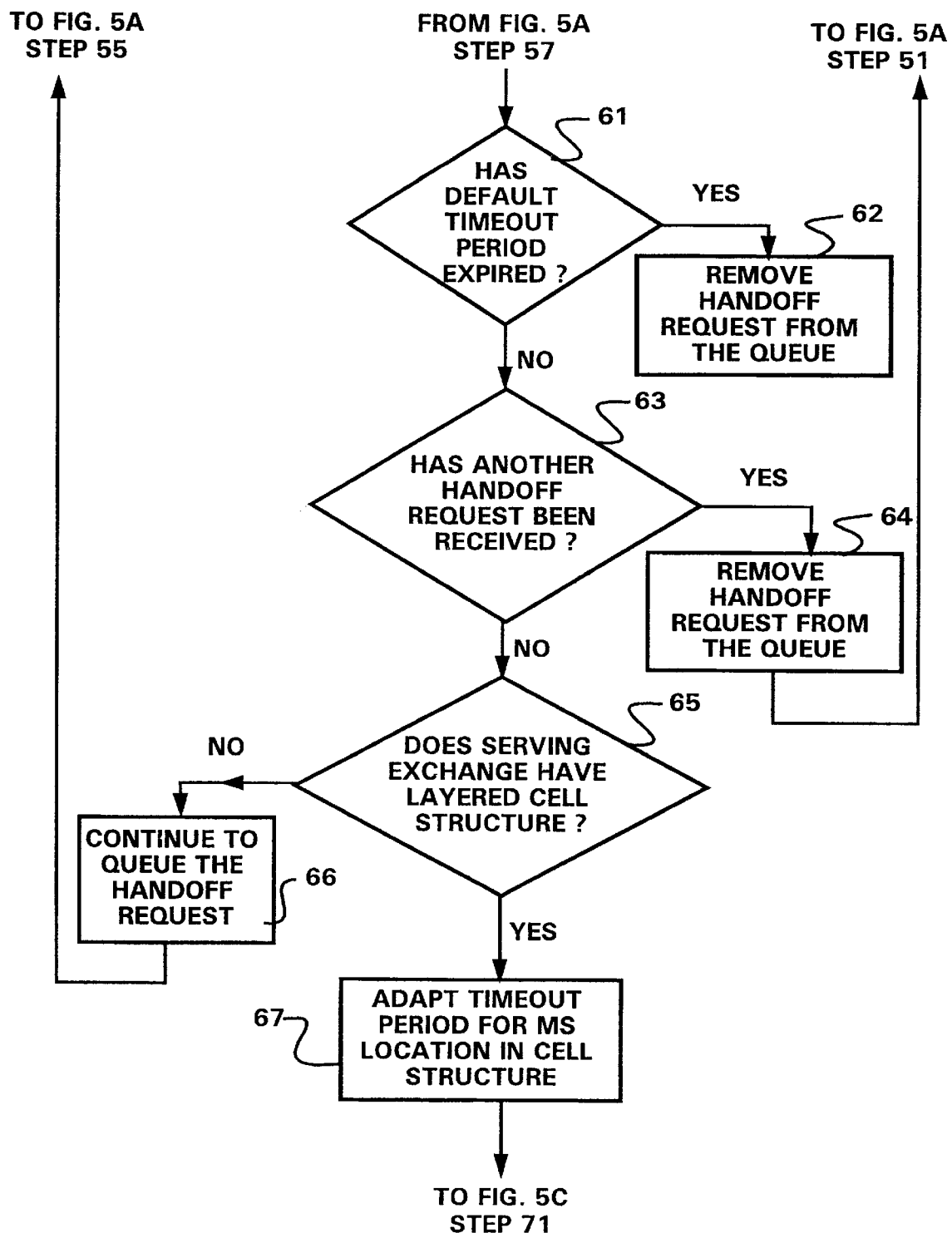

If, however, at step 63 it is determined that another handoff request has not been received, then the process moves to step 65 where it is determined whether or not the serving exchange has a layered cell structure for which the predetermined default queuing timeout period is not optimal. If the serving exchange does not have a layered cell structure for which the predetermined default queuing timeout period is not optimal, the process continues to queue the handoff request at 66 and then returns to step 55 (FIG. 5A). Thereafter, if the call is not terminated, a voice channel does not become available, or another handoff request is not received before the expiration of the default queuing timeout period, the request remains queued until the default period expires.

If, however, it is determined at step 65 that the serving exchange does have a layered cell structure for which the default queuing timeout period is not optimal, then the process moves to step 67 where the queuing timeout period is adapted (shortened or lengthened) for the mobile station's location in the layered cell structure. Thereafter, if the call is not terminated, a voice channel does not become available, or another handoff request is not received before the expiration of the default queuing timeout period, the request remains queued until the adapted timeout period expires.

Figure 5C:
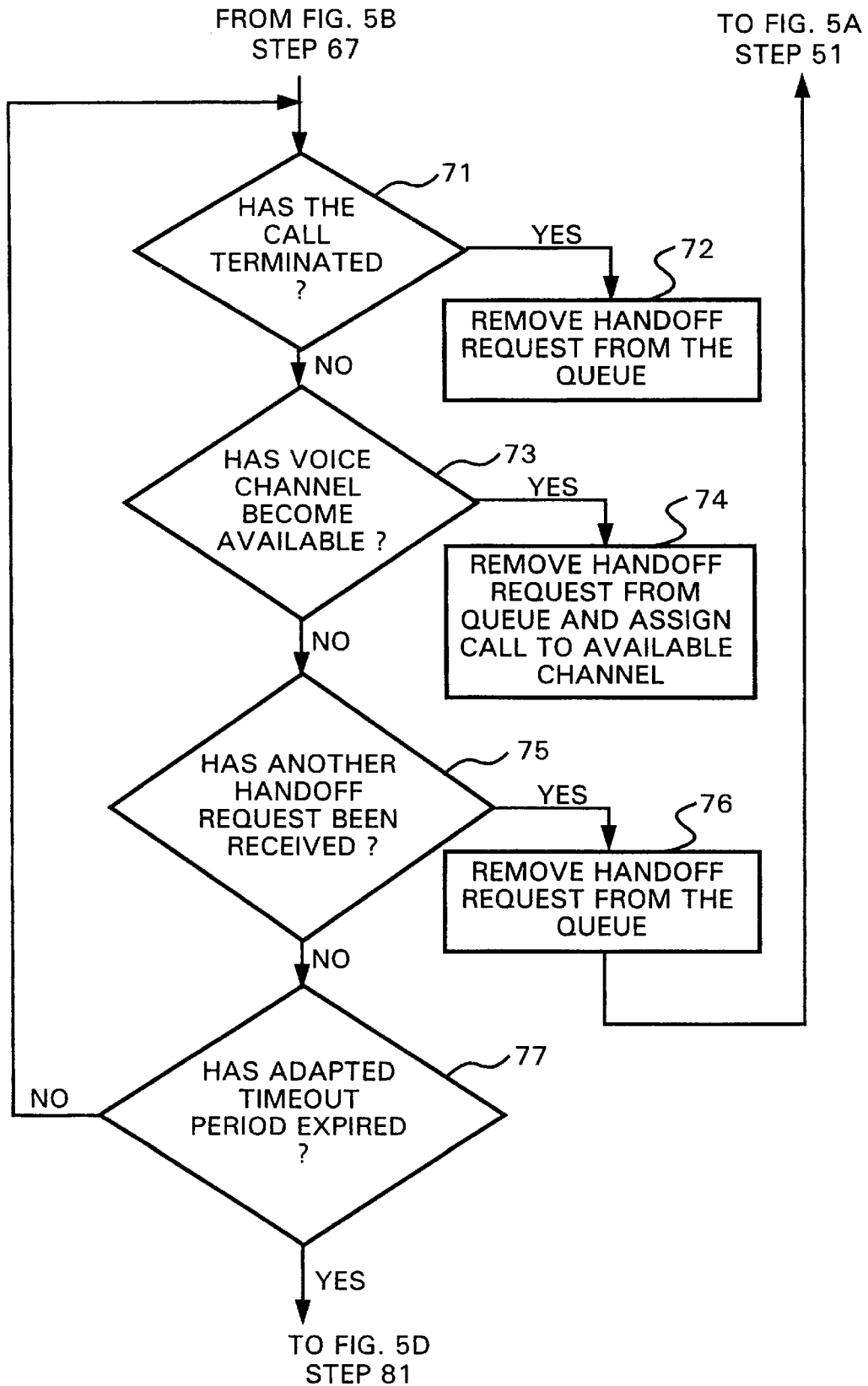

Therefore, following step 67, the process moves to FIG. 5C, step 71 where it is determined whether or not the call has been terminated. If the call has been terminated, the process moves to step 72 where the handoff request is removed from the queue. If the call has not terminated, the process moves from step 71 to step 73 where it is determined whether or not a voice channel has become available in the first candidate cell. If a voice channel has become available, the handoff request is removed from the queue at step 74, and the call is assigned to the available voice channel. If, however, a voice channel has not become available, the process moves to step 75 where it is determined whether or not a subsequent handoff request has been received from the mobile station. If another handoff request has been received, the process removes the handoff request from the queue at 76, and then returns to step 51 (FIG. 5A) where the handoff process starts over by checking for an available voice channel in all of the cells in the candidate list for handoff included in the subsequent handoff request.

If, however, at step 75 it is determined that another handoff request has not been received, then the process moves to step 77 where it is determined whether or not the adapted timeout period has expired. If the adapted timeout period has not expired, the process returns to step 71 and continues to queue the handoff request. If it is determined that the adapted timeout period has expired, the process moves from step 77 to FIG. 5D, step 81 and takes one of three alternative steps. First, the process may merely remove the handoff request from the queue at step 82. Second, if the mobile station is in a microcell having an umbrella macrocell, and the target cell for handoff is another microcell, the process may redirect the target cell to the umbrella macrocell at step 83. There is a greater likelihood that the umbrella macrocell will still be a viable handoff target at the expiration of the queuing timeout period. Finally, the process may move to step 84 where the process re-checks for an available voice channel in all the cells in the candidate list for handoff. At step 85, it is determined whether or not there is an available voice channel in any of the cells in the candidate list for handoff. If there is an available voice channel, the call is assigned to the available channel at step 86. If, however, there is not an available channel, the process moves to step 87 where the handoff request is removed from the queue.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A system for adapting a time period for collecting signal strength measurements from a plurality of cells that neighbor a serving cell in a cellular telecommunications network, said system comprising:

a variable timing mechanism that measures time periods starting when a handoff measurement request is generated;

means for setting said variable timing mechanism to measure a specified time period for each of said plurality of cells;

means for collecting said signal strength measurements during said specified time period; and means for processing said signal strength measurements when said specified time period expires.

2. The system of claim 1 further comprising:

means for determining a layered cell structure within said cellular telecommunications network;

means for identifying microcells and macrocells within said layered cell structure; and means for specifying said time period for each of said microcells and macrocells to optimize handoff performance in said network.

3. The system of claim 2 wherein said means for specifying a time period for each of said microcells and macrocells that optimizes handoff performance in said network includes:

means for assigning a plurality of cell attributes to each of said microcells and macrocells in said network, said attributes including:

cell size;

position of each microcell and macrocell in said layered cell structure; and neighbor cells of each microcell and macrocell;

means for associating a time value with each of said plurality of cell attributes; and means for calculating a cumulative time period for said specified time period.

4. The system of claim 2 further comprising:

means for identifying border cells that border on exchange boundaries in said network; and means for specifying a time period for each of said border cells that optimizes handoff performance in said network.

5. The system of claim 4 wherein said means for specifying a time period for each of said border cells that optimizes handoff performance in said network includes:

means for assigning a plurality of cell attributes to each of said border cells in said network, said attributes including:

cell size;

position of each border cell in said layered cell structure;
each border cell's neighbor cells; and
each border cell's neighbor outer cells;
means for associating a time value with each of said plurality of cell attributes; and
means for calculating a cumulative time period for said specified time period.

6. A method of adapting a time period for collecting signal strength measurements from a plurality of cells that neighbor a serving cell in a cellular telecommunications network, said method comprising the steps of:
measuring a specified time period for each of said plurality of cells starting when a handoff measurement request is generated;
collecting said signal strength measurements during said specified time period; and
processing said signal strength measurements when said specified time period expires.

7. The method of claim 6 further comprising the steps of:
determining a layered cell structure within said cellular telecommunications network;
identifying microcells and macrocells within said layered cell structure; and
specifying said time period for each of said microcells and macrocells to optimize handoff performance in said network.

8. The method of claim 7 wherein said step of specifying said time period for each of said microcells and macrocells to optimize handoff performance in said network includes:
assigning a plurality of cell attributes to each of said microcells and macrocells in said network, said attributes including:
cell size;
position of cell in said layered cell structure; and
neighbor cells;
associating a time value with each of said plurality of cell attributes; and
calculating a cumulative time period for said specified time period.

9. The method of claim 7 further comprising the steps of:
identifying border cells that border on exchange boundaries in said network; and
specifying said time period for each of said border cells to optimize handoff performance in said network.

10. The method of claim 9 wherein said step of specifying a time period for each of said border cells that optimizes handoff performance in said network includes:
assigning a plurality of cell attributes to each of said border cells in said network, said attributes including:
cell size;
position of cell in said layered cell structure;
neighbor cells; and
neighbor outer cells;
associating a time value with each of said plurality of cell attributes; and
calculating a cumulative time period for said specified time period.

* * * * *